(12) United States Patent
Nelson et al.

(10) Patent No.: US 10,342,188 B2
(45) Date of Patent: Jul. 9, 2019

(54) METHODS AND APPARATUS FOR VERTICAL HANGING PLANT CONTAINER

(71) Applicant: Woolly Pocket LLC, North Kansas City, MO (US)

(72) Inventors: Miguel E. Nelson, Los Angeles, CA (US); Adlai Kunst, Kansas City, MO (US)

(73) Assignee: WallyGro LLC, Kansas City, MO (US)

( * ) Notice: Subject to any disclaimer, the term of this patent is extended or adjusted under 35 U.S.C. 154(b) by 732 days.

(21) Appl. No.: 14/478,177

(22) Filed: Sep. 5, 2014

(65) Prior Publication Data

US 2014/0373444 A1 Dec. 25, 2014

Related U.S. Application Data

(63) Continuation-in-part of application No. 13/740,487, filed on Jan. 14, 2013, now Pat. No. 9,226,456, which is a continuation-in-part of application No. 13/066,950, filed on Apr. 28, 2011, now Pat. No. 8,567,122, which is a continuation-in-part of application No. PCT/US2010/000743, filed on Mar. 10, 2010.

(60) Provisional application No. 61/922,476, filed on Dec. 31, 2013, provisional application No. 61/209,768, filed on Mar. 10, 2009, provisional application No. 61/336,985, filed on Jan. 29, 2010.

(51) Int. Cl.
*A01G 27/02* (2006.01)
*A01G 9/02* (2018.01)

(52) U.S. Cl.
CPC ............... *A01G 27/02* (2013.01); *A01G 9/02* (2013.01); *A01G 9/022* (2013.01)

(58) Field of Classification Search
CPC .......... A01G 9/02; A01G 27/02; A01G 9/022; A01G 27/06; A01G 9/023
See application file for complete search history.

(56) References Cited

U.S. PATENT DOCUMENTS 195,094 A * 9/1877 Crowther ............... A01G 27/02
                                               47/65.6
955,644 A * 4/1910 Hershkovitz ............ A01G 9/02
                                                  47/75

(Continued)

FOREIGN PATENT DOCUMENTS

FR         470151    * 3/1914
FR      2902966 A1   1/2008

(Continued)

*Primary Examiner* — Magdalena Topolski
(74) *Attorney, Agent, or Firm* — The Noblitt Group, PLLC

(57) ABSTRACT

Methods and apparatus for a vertical hanging plant container comprise a container comprising a moisture impermeable reservoir and at least one breathable zone positioned above the reservoir. The reservoir may be disposed along a bottom section of the container to serve as a moisture storage region allowing moisture to be wicked upwards by the soil in the container. A first breathable zone may be located above the reservoir in at least one sidewall of the container and allow for the transfer of air and moisture between the soil and an exterior environment surrounding the container. A second breathable zone may be located above the reservoir in an interior divider separating two interior portions of the container.

17 Claims, 15 Drawing Sheets

(56) References Cited

U.S. PATENT DOCUMENTS

| | | | | |
|---|---|---|---|---|
| 1,272,713 A * | 7/1918 | Reily | ............ | A01G 27/02 47/79 |
| 1,317,569 A * | 9/1919 | Forster | ............ | A01G 27/02 47/79 |
| 1,557,712 A * | 10/1925 | Little | ............ | A01G 9/02 47/65.6 |
| 2,810,235 A * | 10/1957 | Magid | ............ | A01G 27/06 47/81 |
| 3,243,919 A * | 4/1966 | Carlson | ............ | A01G 27/00 47/79 |
| 3,857,934 A | 12/1974 | Bernstein et al. | | |
| 4,102,080 A * | 7/1978 | Kojo | ............ | A01G 9/02 47/67 |
| 4,142,324 A * | 3/1979 | Magyar, Jr. | ............ | A01G 9/10 47/75 |
| 4,439,950 A | 4/1984 | Kelley | | |
| 4,908,315 A | 3/1990 | Kertz | | |
| 4,949,843 A | 8/1990 | Stokes | | |
| 5,107,621 A * | 4/1992 | Deutschmann, Sr. | ............ | A01G 27/008 47/59 R |
| 5,664,367 A * | 9/1997 | Huang | ............ | A47G 7/044 248/311.2 |
| 5,852,896 A * | 12/1998 | Flasch, Jr. | ............ | A01G 27/02 47/48.5 |
| 6,722,081 B1 | 4/2004 | Bradley et al. | | |
| 6,733,210 B2 | 5/2004 | Chen | | |
| 6,766,817 B2 | 7/2004 | da Silva | | |
| 6,789,355 B2 | 9/2004 | Rajagopalan | | |
| 6,971,205 B2 * | 12/2005 | Woodruff | ............ | A01G 9/022 47/65.5 |
| 7,621,075 B2 | 11/2009 | Rajagopalan | | |
| 8,051,603 B1 * | 11/2011 | Jung | ............ | A01G 9/026 47/66.1 |
| 2004/0200141 A1 | 10/2004 | Whitcomb | | |
| 2005/0166451 A1 | 8/2005 | Stachnik | | |
| 2006/0059775 A1 | 3/2006 | L'Estrange | | |
| 2007/0269275 A1 | 11/2007 | Kimberlin | | |
| 2009/0020446 A1 | 1/2009 | Frankenstein et al. | | |
| 2009/0300984 A1 * | 12/2009 | Gordon | ............ | A01G 25/02 47/66.7 |
| 2011/0059518 A1 | 3/2011 | Bribach et al. | | |
| 2011/0302837 A1 | 12/2011 | Chen | | |
| 2012/0017504 A1 * | 1/2012 | Lin | ............ | A01G 9/02 47/65.5 |
| 2012/0227316 A1 * | 9/2012 | Ptak | ............ | A01G 9/02 47/32.3 |
| 2013/0000197 A1 | 1/2013 | Vrana et al. | | |
| 2013/0125459 A1 | 5/2013 | Nelson et al. | | |
| 2013/0180172 A1 * | 7/2013 | Silverberg | ............ | A01G 9/022 47/65 |
| 2015/0027046 A1 * | 1/2015 | Adolf | ............ | A01G 9/02 47/65.5 |

FOREIGN PATENT DOCUMENTS

| | | |
|---|---|---|
| FR | 2902967 | 1/2008 |
| GB | 2152345 A | 8/1985 |

* cited by examiner

METHODS AND APPARATUS FOR VERTICAL HANGING PLANT CONTAINER

CROSS-REFERENCES TO RELATED APPLICATIONS

This application claims the benefit of U.S. Provisional Patent Application No. 61/922,476, Dec. 31, 2013 and is a Continuation-in-part of application of U.S. application Ser. No. 13/740,487 filed Jan. 14, 2013, which is a Continuation-in-part of application of U.S. application Ser. No. 13/066,950 filed Apr. 28, 2011 (now U.S. Pat. No. 8,567,122), which is a Continuation-in-part of International Application No. PCT/US2010/00743 filed on Mar. 10, 2010, and claims the benefit of U.S. Provisional Patent Application No. 61/209,768 filed Mar. 10, 2009, and U.S. Provisional Patent Application No. 61/336,985 filed Jan. 29, 2010 and incorporates the disclosure of each application in its entirety by reference. To the extent that the present disclosure conflicts with any referenced application, however, the present disclosure is to be given priority.

BACKGROUND

Plants are commonly grown out of the ground in various types of containers including clay and plastic pots and containers comprised of flexible materials hung from various surfaces. Containers that use micro-porous film may transmit air, gas, and vapor, but can still act as a barrier to water. Impermeability of some materials to air, moisture, and water may damage long-term plant health, especially where the amount of soil held by the container is small. For example, micro-porous materials may not allow water to permeate the container fast enough and result in overexposing the plant to moisture, which can cause rotting of the plant roots. However, over longer time periods, the lack of a water impermeable layer can eventually result in the micro-porous material allowing condensation to seep through the bottom and sidewalls of the container, since it is not absorbent enough to provide condensation protection. One solution to this problem has been to place a hole or opening at the bottom of the container to allow excess water to escape. However, when a container is overwatered, the hole also allows soil and/or nutrients within the soil to escape along with the excess water. Further, the escaping water may cause damage and/or create an undesired situation to surrounding areas.

BRIEF SUMMARY

Methods and apparatus for vertical hanging plant container according to various aspects of the present technology comprise a container comprising a moisture impermeable reservoir and at least one breathable zone positioned above the reservoir. The reservoir may be disposed along a bottom section of the container to serve as a moisture storage region allowing moisture to be wicked upwards by the soil in the container. A first breathable zone may be located above the reservoir in at least one sidewall of the container and allow for the transfer of air and moisture between the soil and an exterior environment surrounding the container. A second breathable zone may be located above the reservoir in an interior divider separating two interior portions of the container.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

Figure 1:
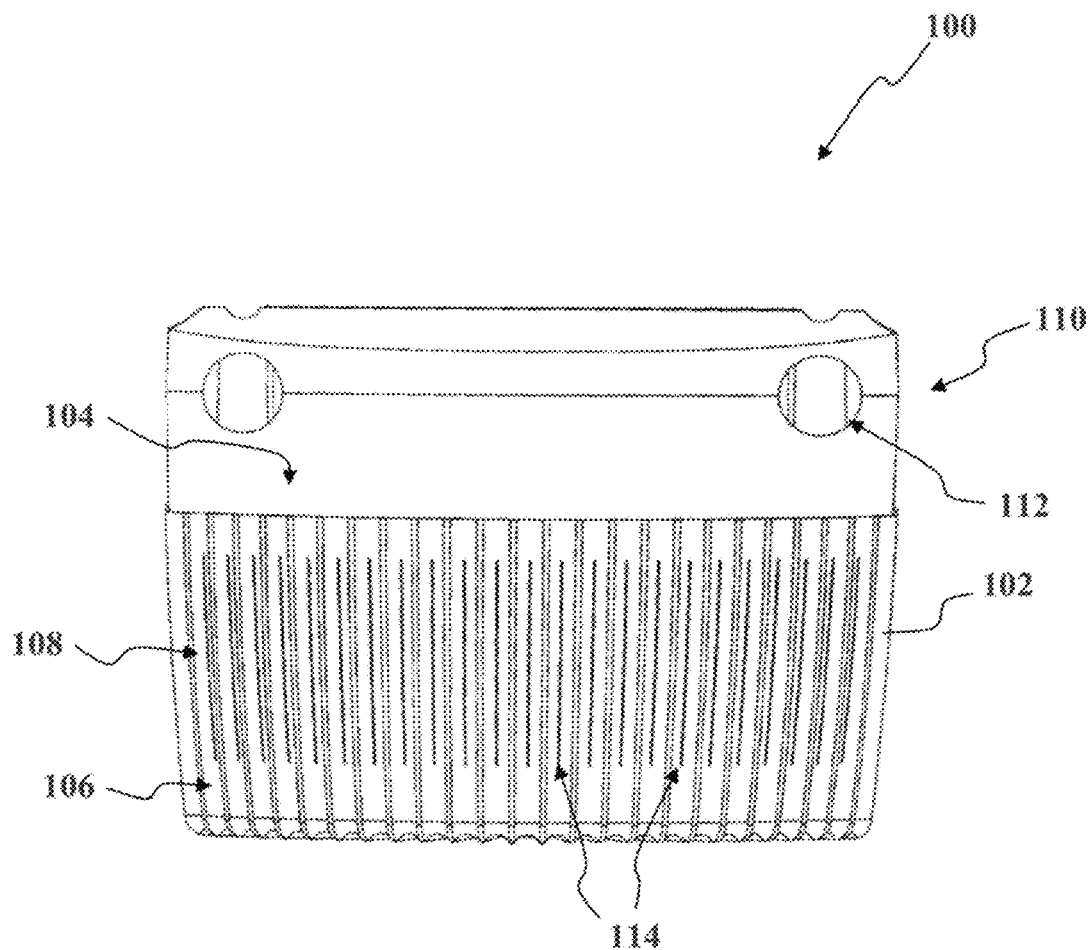
FIG. 1 representatively illustrates a front view of a planter in accordance with an exemplary embodiment of the present technology.

To facilitate understanding of the technology, identical reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF EXEMPLARY EMBODIMENTS

The present technology relates to as hanging planter comprising at least one breathable zone and a water retaining section. More specifically the present technology relates to a hanging planter that may be formed as a vessel for retaining plants in a substantially vertical position, such as being mounted, hung, or otherwise coupled to a wall or ceiling. The present technology may be described in terms of functional block components and various processing steps. Such functional blocks may be realized by any number of components configured to perform the specified functions and achieve the various results. For example, the present technology may employ various types of materials, fasteners, ducting, storage containers, and the like, which may carry out a variety of functions. In addition, the present technology may be practiced in conjunction with any number of processes such as garden planting, plant training, decorating, and the system described is merely one exemplary application for the technology.

Figure 2:
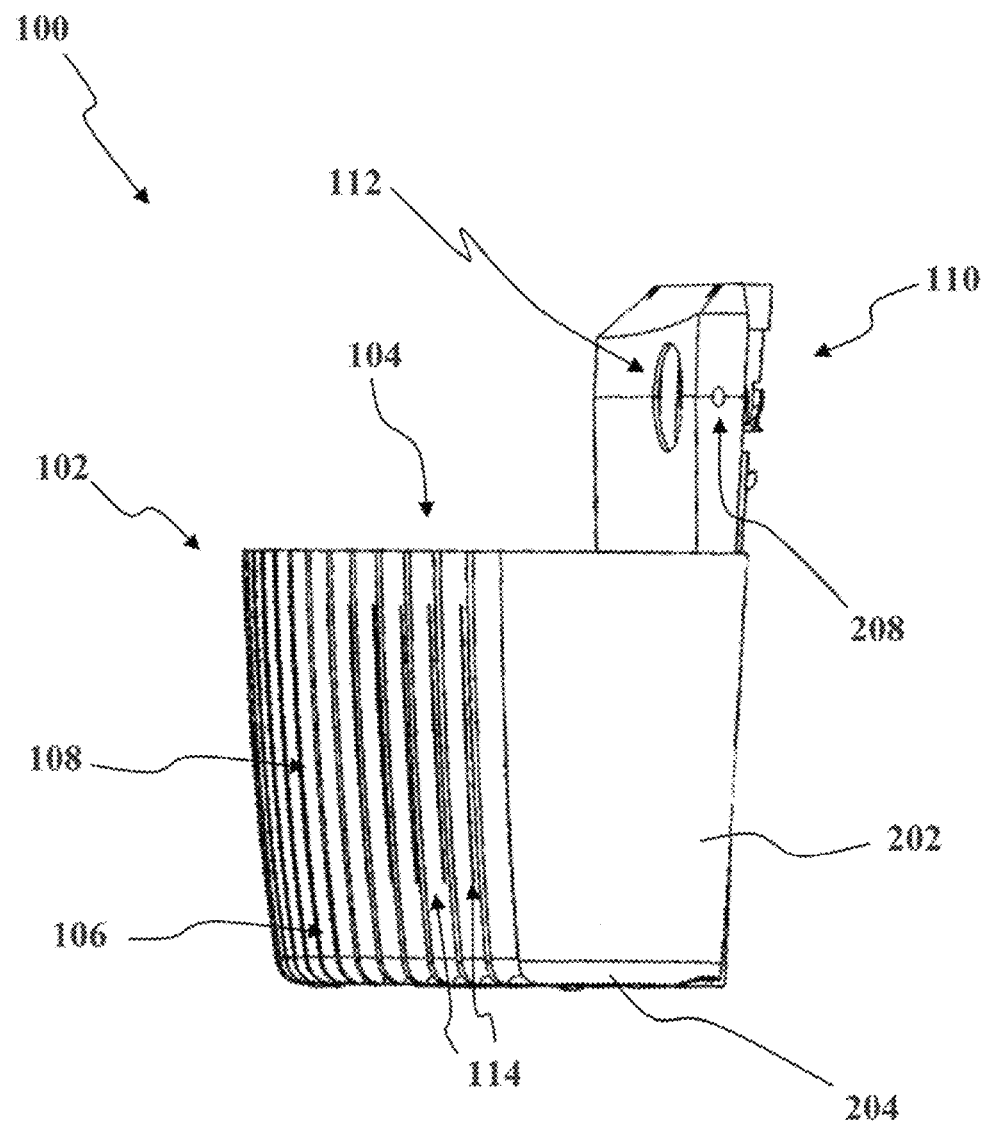
FIG. 2 representatively illustrates a side view of the plainer in accordance with an exemplary embodiment of the present technology.
Figure 3:
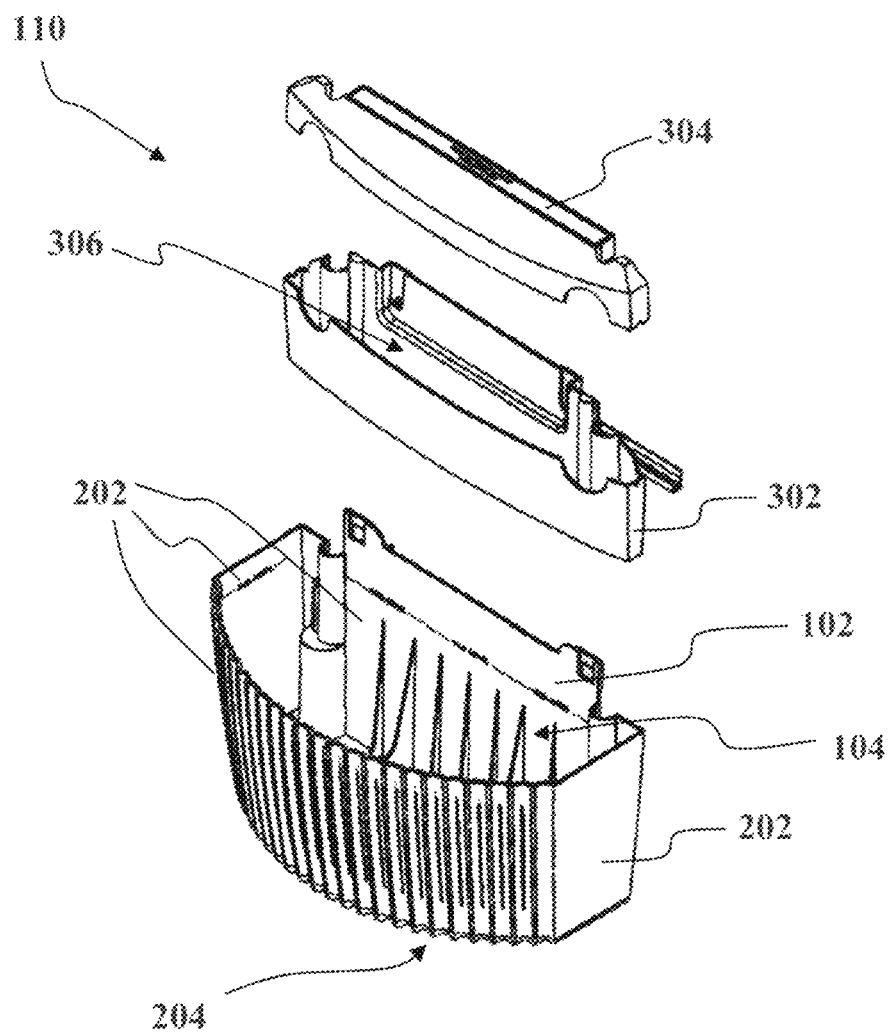
FIG. 3 representatively illustrates a top front perspective view of the planter and a water dispersal unit in accordance with an exemplary embodiment of the present technology.
Figure 4:
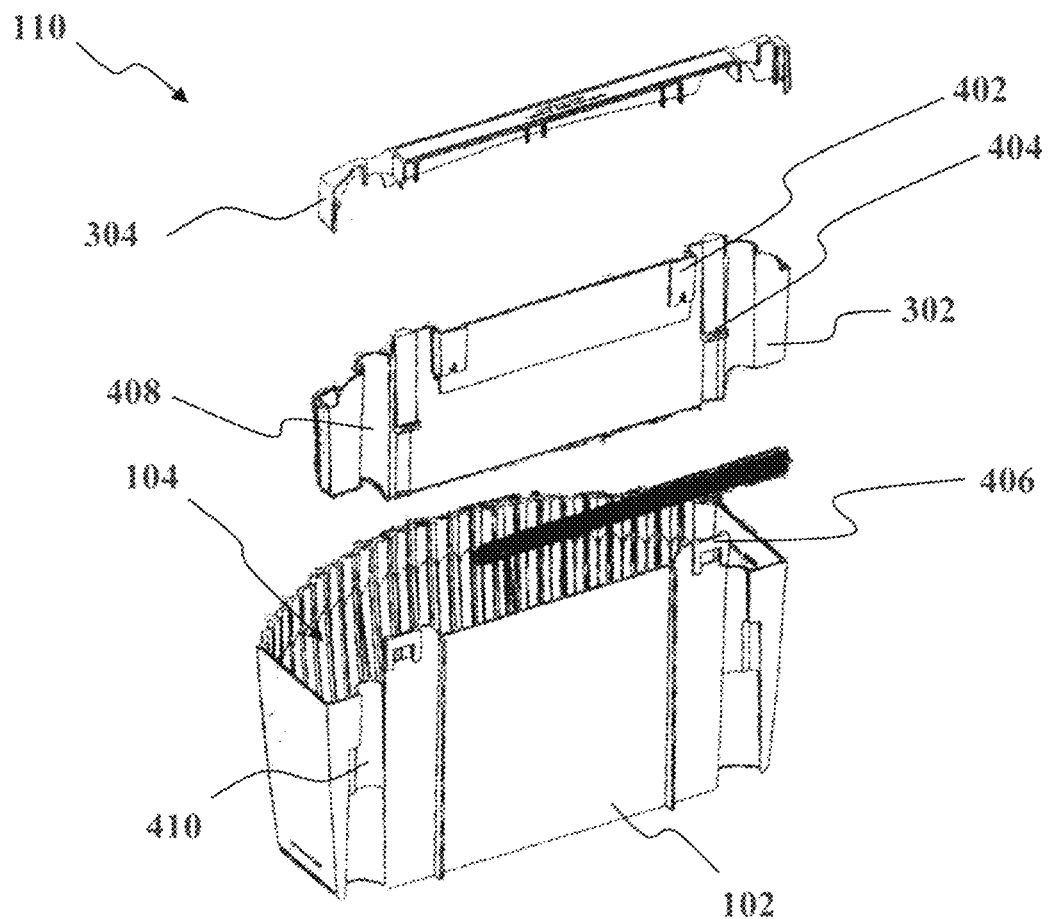
FIG. 4 representatively illustrates a rear perspective view of the planter and the water dispersal unit in accordance with an exemplary embodiment of the present technology.

Referring now to FIGS. 1 and 2, in one embodiment, methods and apparatus for vertical hanging planter 100 may comprise a container 102 configured with an open interior 104 divided into at moisture reservoir 106 and a breathable zone 108. The planter 100 may further comprise a water distribution unit 110 coupled to the container 102 for receiving and dispersing water to the open interior 104.

The container 102 may be configured to receive and store a plant and any additional elements such as soil, rock, compost, mulch, and the like. The container 102 may comprise any suitable device or structure for containing a plant. For example, in one embodiment, the container may comprise a rigid or semi-rigid body having a base 204 and one or more sidewall elements 202 arranged around the peripheral edges of the base 204 and extending upwards to form the open interior 104. The sidewall elements 202 may be coupled to the base and/or each other by a suitable method such as mechanically fastened, adhesively bonded, welded, or the like. Alternatively, the sidewall elements 202 and the base 204 may be formed as a single unit such as from a molding or extrusion process.

The base 204 and sidewall elements 202 may comprise any suitable material such as plastic, wood, metal, or composite. For example, in one embodiment, the sidewall elements 202 and the base 204 may comprise a molded plastic. The sidewall elements 202 and the base 204 may also be configured to be resistant to various environmental elements such as moisture penetration and ultraviolet exposure. The sidewall elements 202 and the base 204 may also be suitably adapted to be exposed to temperatures of between −20° F. to 170° F. without suffering any structural damage.

Figure 6:
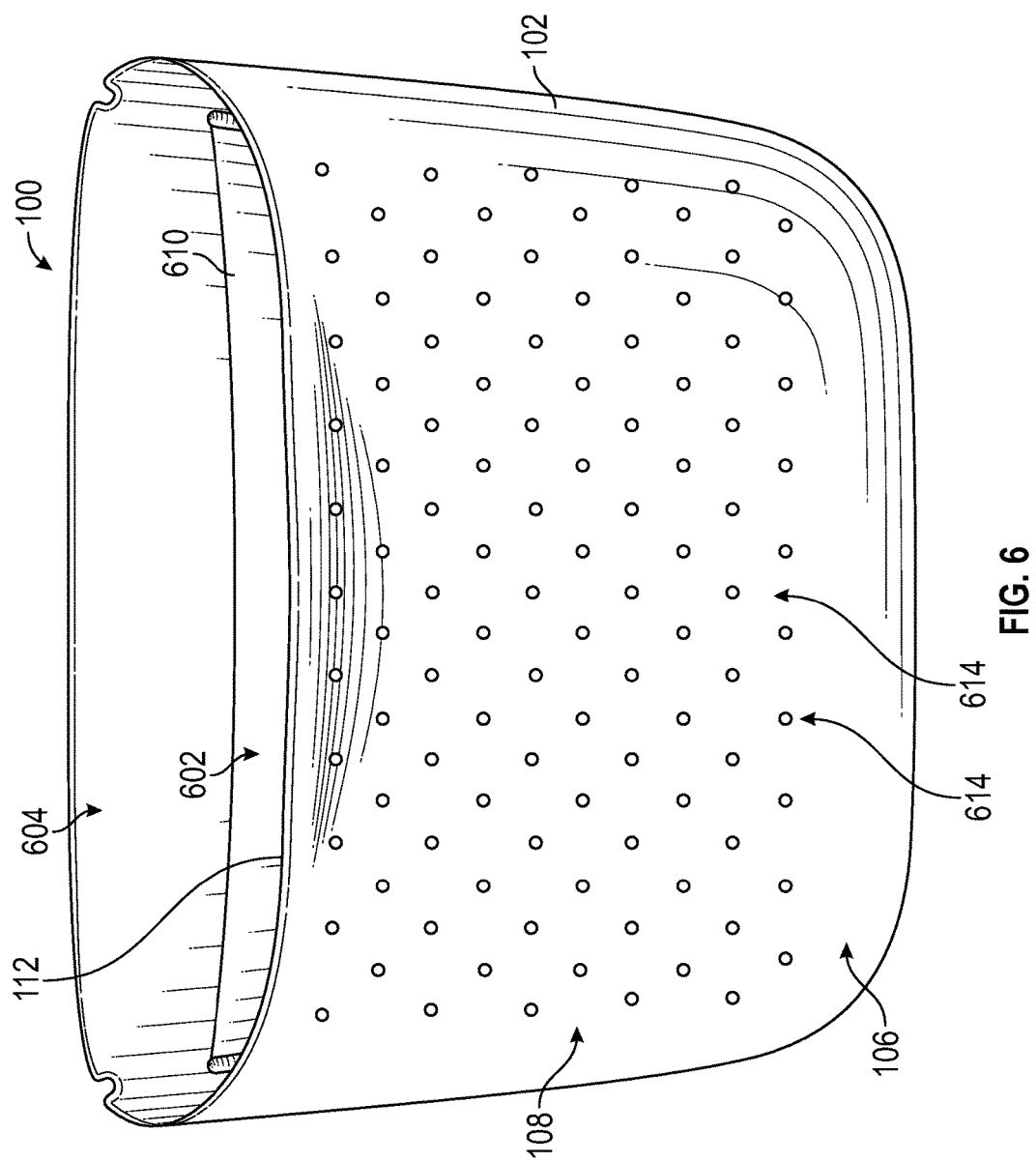
FIG. 6 representatively illustrates a front view of a planter in accordance with a second exemplary embodiment of the present technology.
Figure 7:
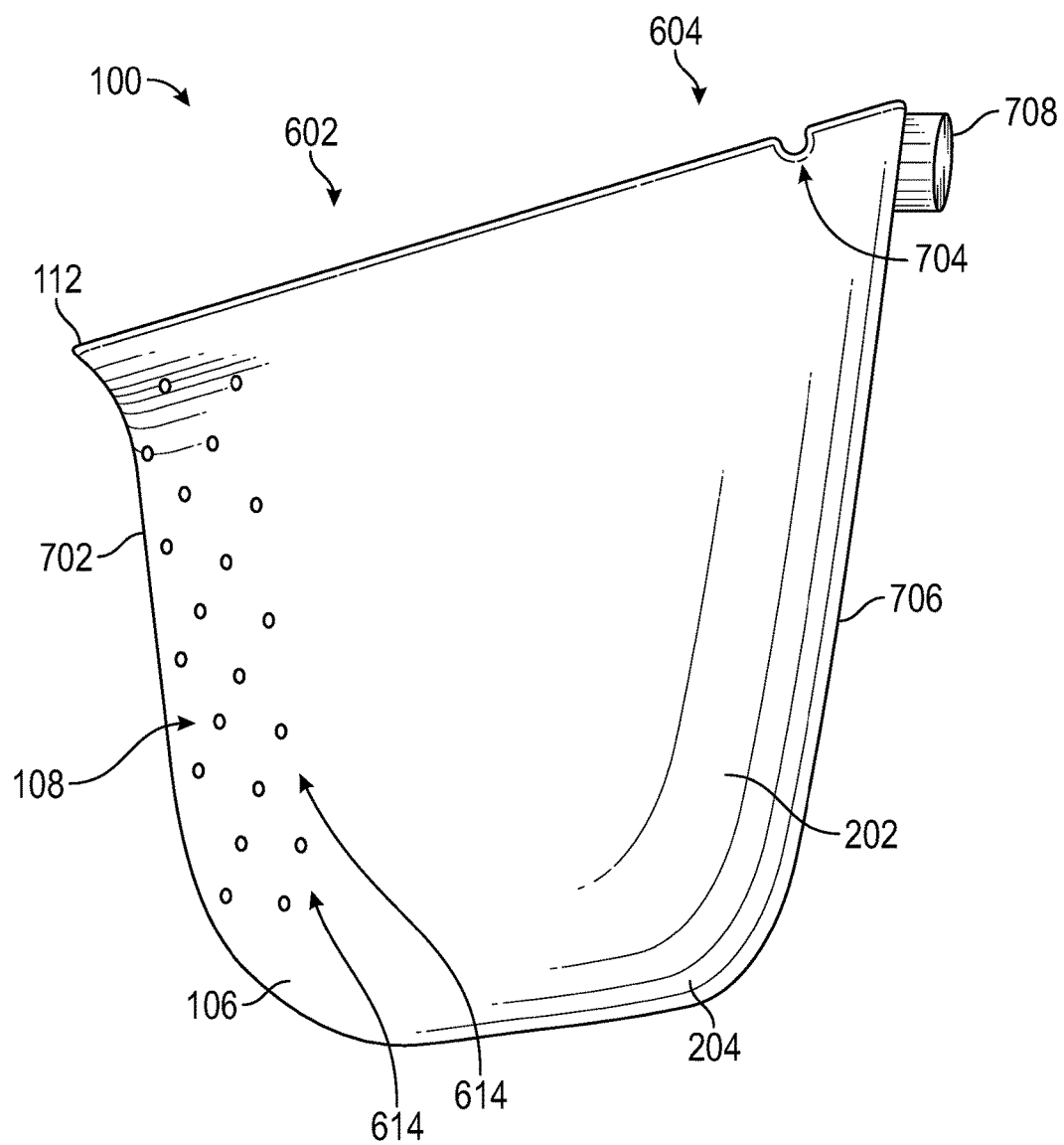
FIG. 7 representatively illustrates a side view of the planter in accordance with the second exemplary embodiment of the present technology.
Figure 11:
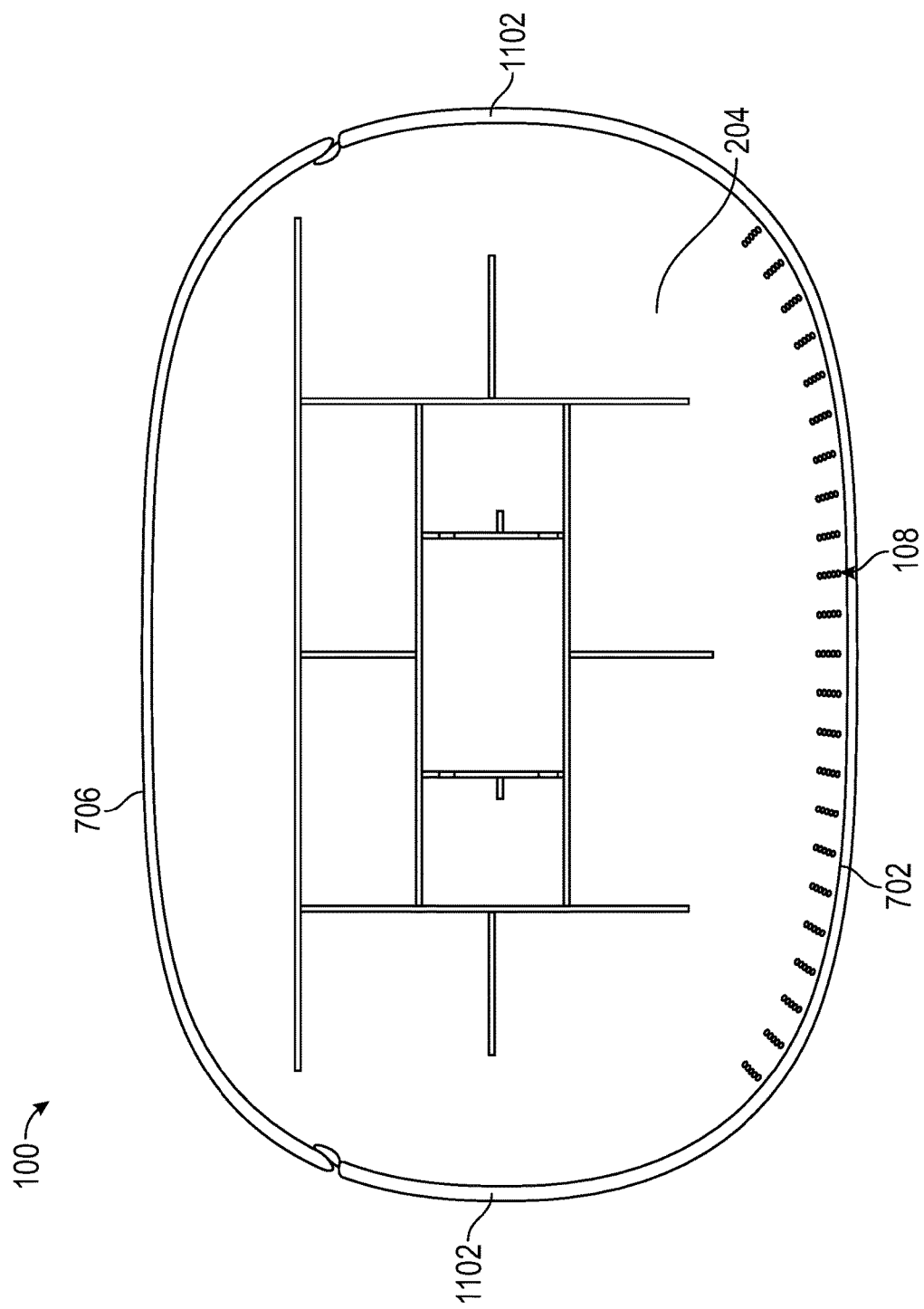
FIG. 11 to representatively illustrates a top view of the planter in accordance with the second exemplary embodiment of the present technology.

Referring now to FIGS. 6 and 7, in a second embodiment, the vertical hanging planter 100 may comprise a container 102 having an open forward interior portion 602 that may be divided into a moisture reservoir 106 and a breathable zone 108. The forward interior portion 602 may be configured to receive and store a plant and any additional elements such as soil, rock, compost, mulch, and the like. The planter 100 may further comprise an open rear interior portion 604 for receiving water. The forward interior portion 602 and the rear interior portion 604 may be separated by an interior divider 610 extending between two opposing interior sidewall sections of the container 102. Referring now to FIGS. 7 and 11, a pair of opposing sidewall elements 1102 may be rounded as they extend between a forward facing sidewall 702 and a rear facing sidewall 706. Alternatively, the pair of opposing sidewall elements 1102 may form a substantially flat surface as they extend between the forward facing sidewall 702 and the rear facing sidewall 706.

The container 102 may further comprise a mounting system suitably configured to allow the container 102 to be selectively coupled, connected, or otherwise attached to a vertical surface such as a wall and/or fence. The mounting system may comprise any system or device for connecting the container 102 to another object. For example, in one embodiment, the mounting system may comprise one or more recesses, notches, or holes configured to couple to a coupling device such as a hook, nail, screw, bolt, or tab.

The mounting system may be disposed directly on the container 102 or it may be suitably configured to be coupled between the container 102 and the mounting surface. For example, the mounting system may comprise a device configured to be permanently or semi-permanently affixed to the vertical surface and allow the container 102 to be selectively coupled to or decoupled from the mounting system.

Referring now to FIGS. 7, 8, 9, 10, and 13, in one embodiment, the container 102 may further comprise a mounting system 708 suitably configured to allow the container 102 to be selectively coupled, connected, or otherwise attached to a substantially vertical surface such as a wall, fence, pole, window, and the like. The mounting system 708 may comprise any system or device for connecting the container 102 to another object. For example, in one embodiment, the mounting system 708 may comprise one or more tabs, notches, books, or holes configured to couple to a coupling device such as a hook, nail, screw, bolt, tab, or mating coupling device.

The mounting system 708 may be disposed directly on the container 102 or it may be suitably configured to be coupled between the container 102 and the mounting surface. For example, referring to FIGS. 7, 8, and 10, the mounting system 708 may comprise a tab extending outward from a rear surface of the container 102 that is suitably configured to be permanently or semi-permanently connected to a coupling device affixed to the vertical surface. Referring now to FIGS. 9, 13, 14, and 16, in as second embodiment, the mounting system 708 may comprise mating hook system 1302 comprising a mounting adapter 1304 suitably configured to mount to the vertical surface such as a wall 1402. For example, a screw 1404 may be used to couple the mounting adapter 1304 to the wall 1402 such than an upper portion of the mounting adapter 1304 is positioned away from the wall 1402 relative to a lower portion of the mounting adapter 1304 which may be flush against the wall 1402. The container 102 may comprise a recessed cleat 1608 or a lip portion suitably configured to hook onto the upper portion of the mounting adapter 1304 to secure the container 102 to the wall 1402. In yet another embodiment, the mounting system 708 may comprise a notched tab disposed along a rearward facing surface of the container 102 that is suitably configured to couple to a wall fastener such as a partially extended screw or bolt.

The moisture reservoir 106 may be configured to store moisture for use by the plant over time. The moisture reservoir 106 may store moisture by any suitable system or method such as by collecting excess moisture into a pool, sponge, or the like. Referring again to FIGS. 1, 2, and 6-9, the moisture reservoir 106 may be disposed along a lower portion of the container 102. For example, in one embodiment the moisture reservoir 106 may comprise it moisture impermeable zone extending upwards a predetermined distance from the base 204 of the container 102 to form a volume capable of storing a liquid such as water. The volume formed by the moisture reservoir 106 may be determined, at least in part, by the distance that a lower most portion of the breathable zone 108 is separated from the base 204 of the container 102.

The breathable zone 108 may be permeable to air and/or water allowing soil in the container 102 to be aerated, air-born nutrients to pass to the roots, inhibit mold growth, and provide for air pruning of the plant root system. The breathable zone 108 may allow air and/or moisture to migrate between the interior 104 of the container 102 and an area surrounding the container 102 by any suitable method. Referring again to FIGS. 1 and 2, in one embodiment the breathable zone 108 may comprise an opening disposed in at least one sidewall element 202. The opening may comprise any size or shape suitable for allowing air and/or moisture to migrate between the soil and the surrounding environment. For example, in one embodiment, the opening may comprise a one or more vertical slits 114 in a forward facing sidewall 702 extending between the moisture reservoir 106 and a top edge of the forward facing sidewall element 202. In a second embodiment, the opening may comprise a series of circular holes arranged in one or more sidewall elements 202.

Referring now to FIGS. 6-9, and 11, in another embodiment the breathable zone 108 may comprise an opening disposed in at least one sidewall element 202 such as the forward facing sidewall 702. The opening may comprise any size or shape suitable for allowing air and/or moisture to migrate between the soil and the surrounding environment. For example, in one embodiment, the opening may comprise one or more circular holes 614 extending from an interior surface to an exterior surface of the forward facing sidewall 702. The circular holes 614 may extend between the moisture reservoir 106 and a top edge 112 of the forward facing sidewall 702. The circular holes 614 may also be positioned along additional surfaces and/or sidewall elements 202. In an alternative embodiment, the opening may comprise a series of vertical slits arranged in one or more sidewall elements 202.

Figure 8:
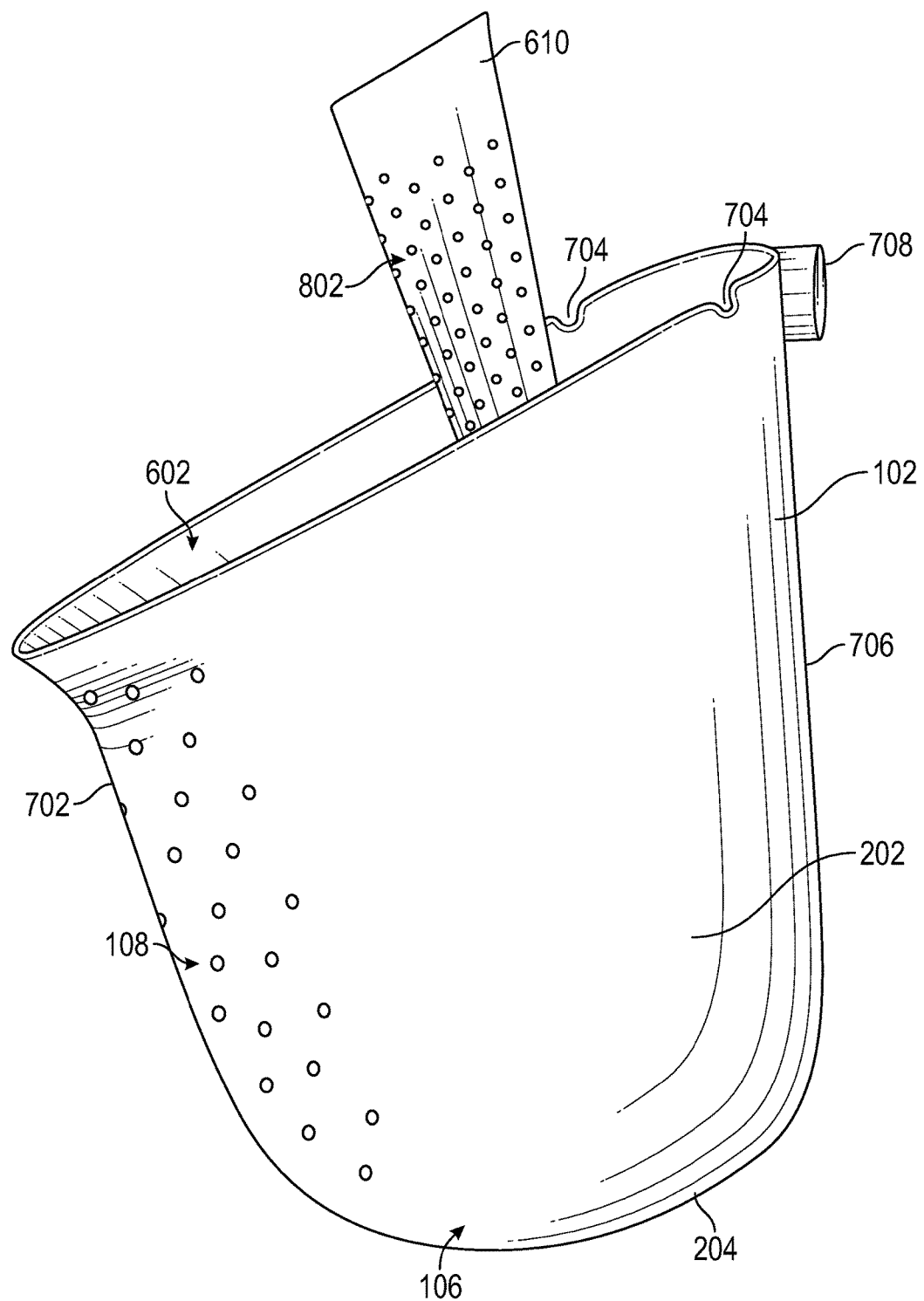
FIG. 8 representatively illustrates a side view of the planter and an interior divider in accordance with the second exemplary embodiment of the present technology.
Figure 9:
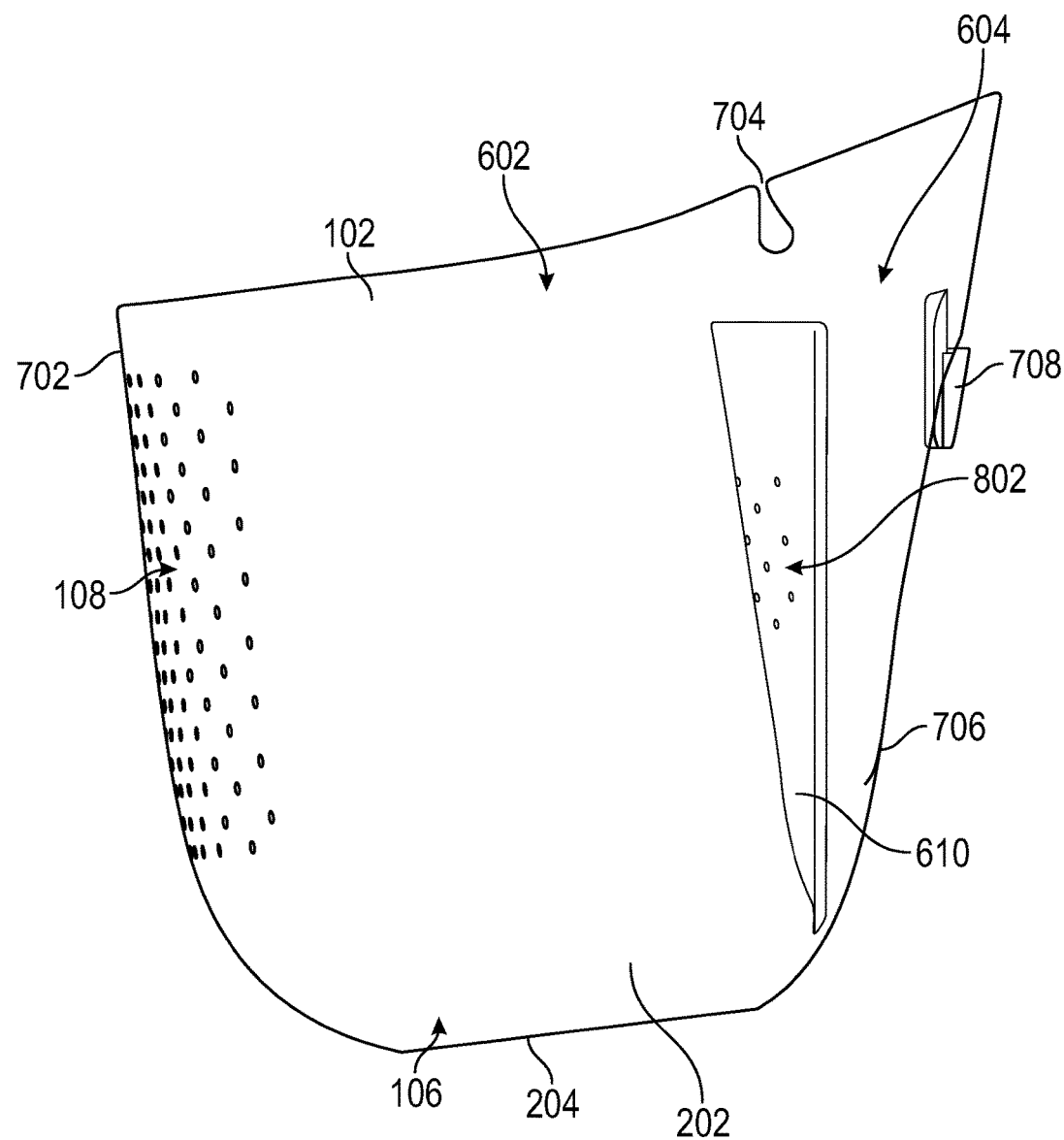
FIG. 9 representatively illustrates a side view of the plant and the interior divider positioned within the interior of the planter in accordance with the second exemplary embodiment of the present technology.
Figure 10:
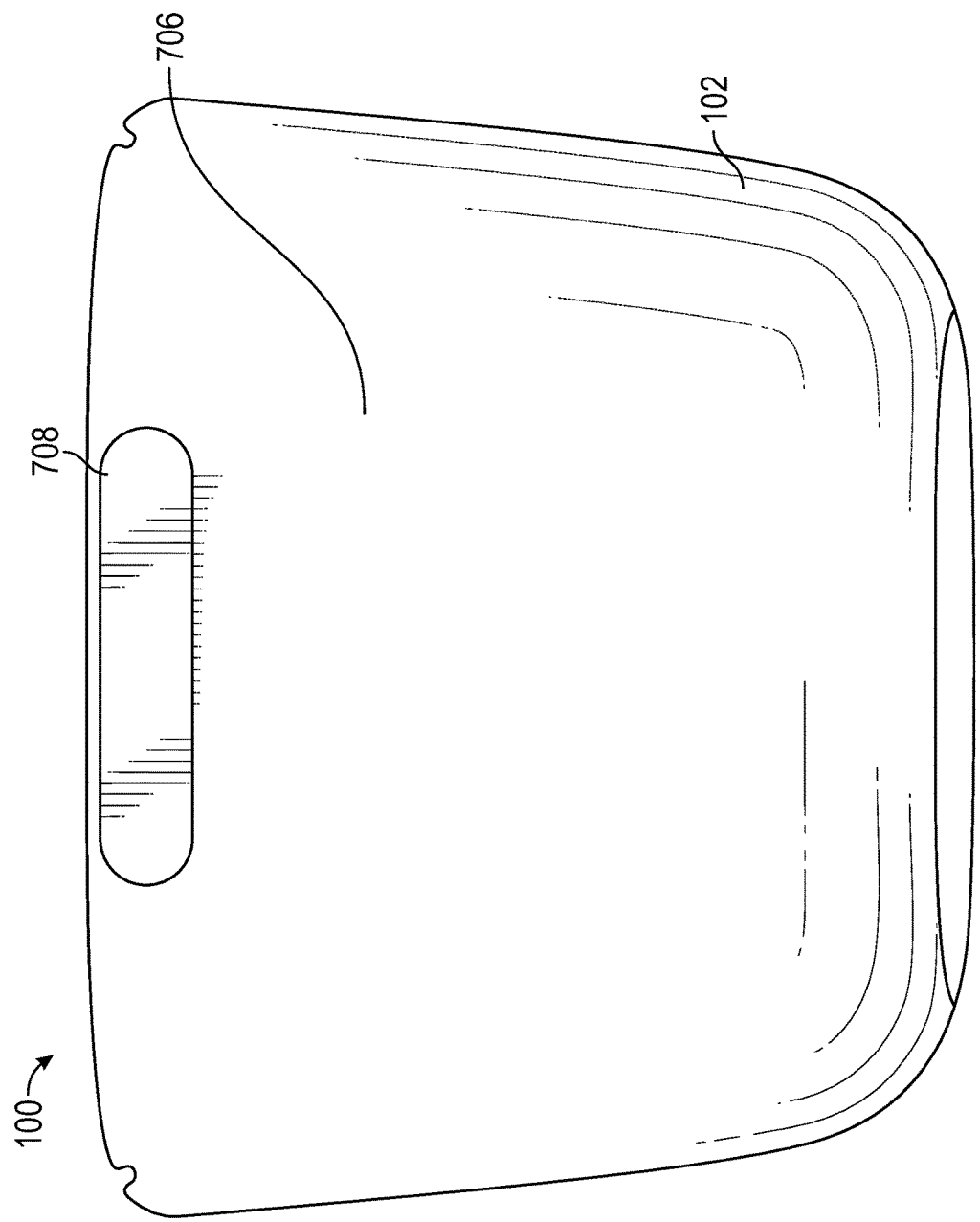
FIG. 10 representatively illustrates a rear perspective view of the planter accordance with the second exemplary embodiment of the present technology.
Figure 12:
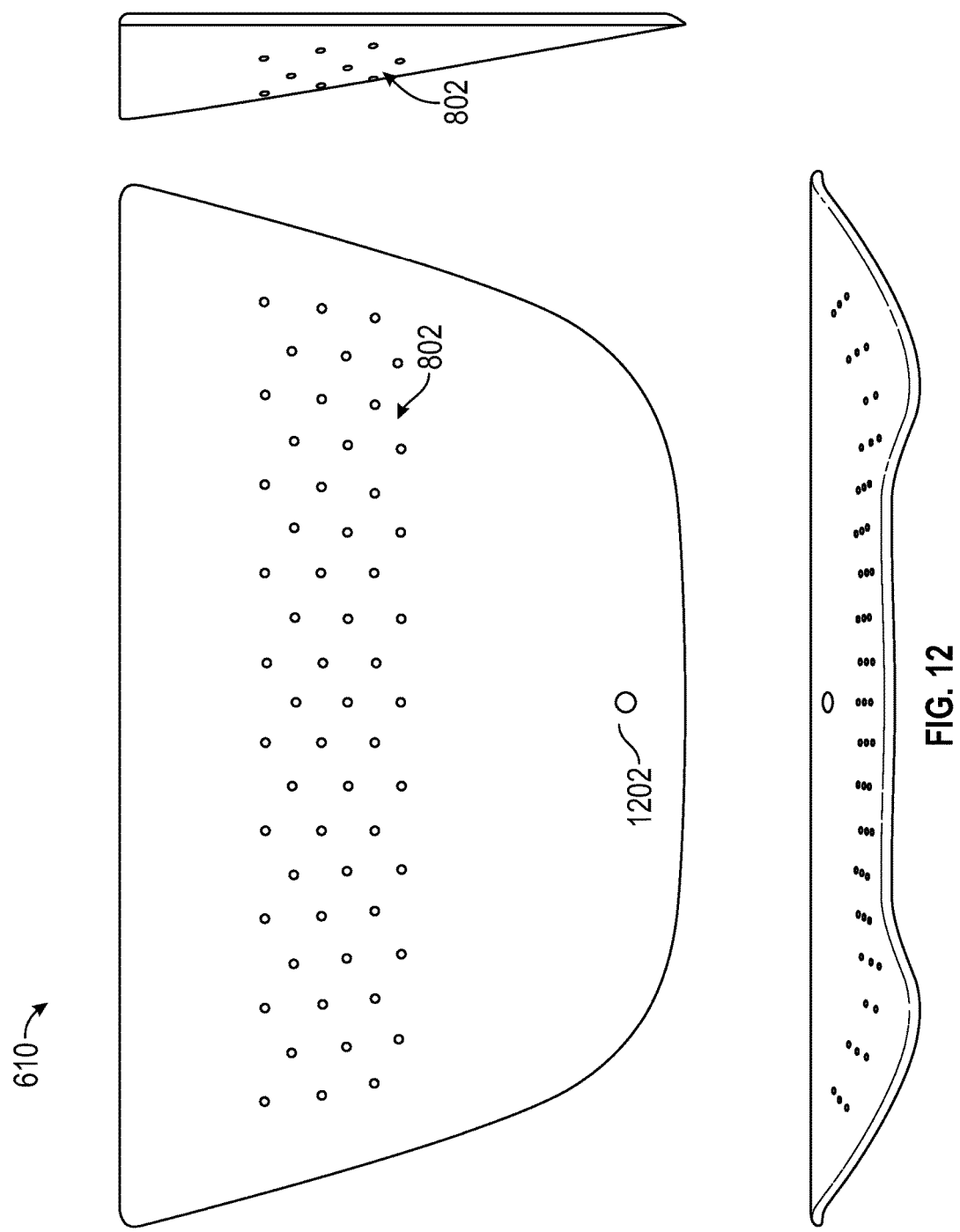
FIG. 12 representatively illustrates a forward, top, and side view of the interior divider in accordance with the second exemplary embodiment of the present technology.
Figure 13:
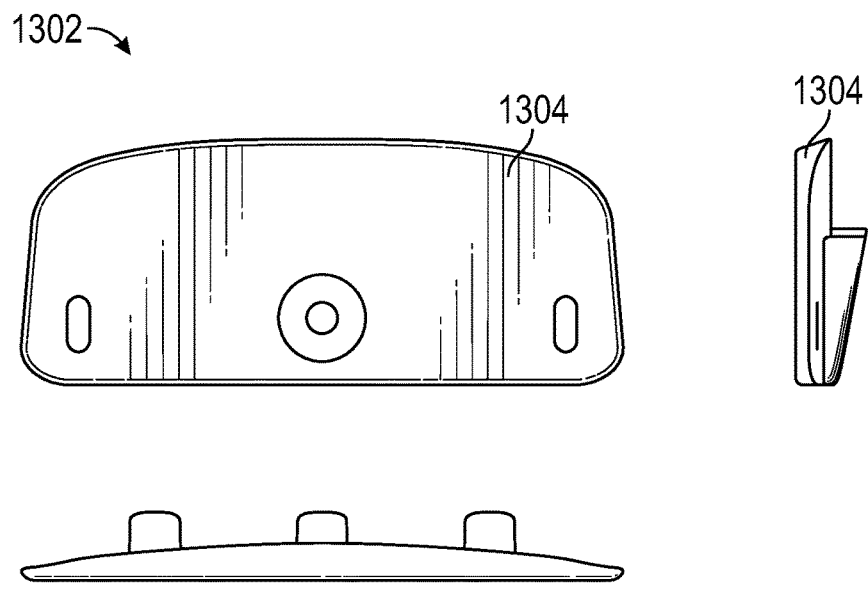
FIG. 13 representatively illustrates a forward, top, and side view of connector element in accordance with the second exemplary embodiment of the present technology.
Figure 14:
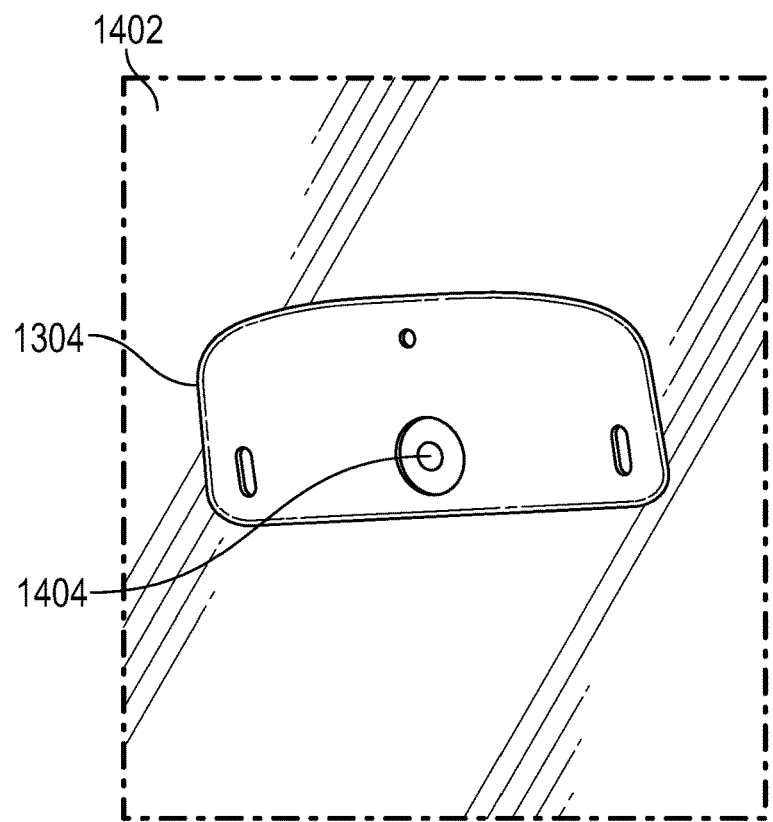
FIG. 14 representatively illustrates the connector element coupled to a vertical surface in accordance with the second exemplary embodiment of the present technology.
Figure 15:
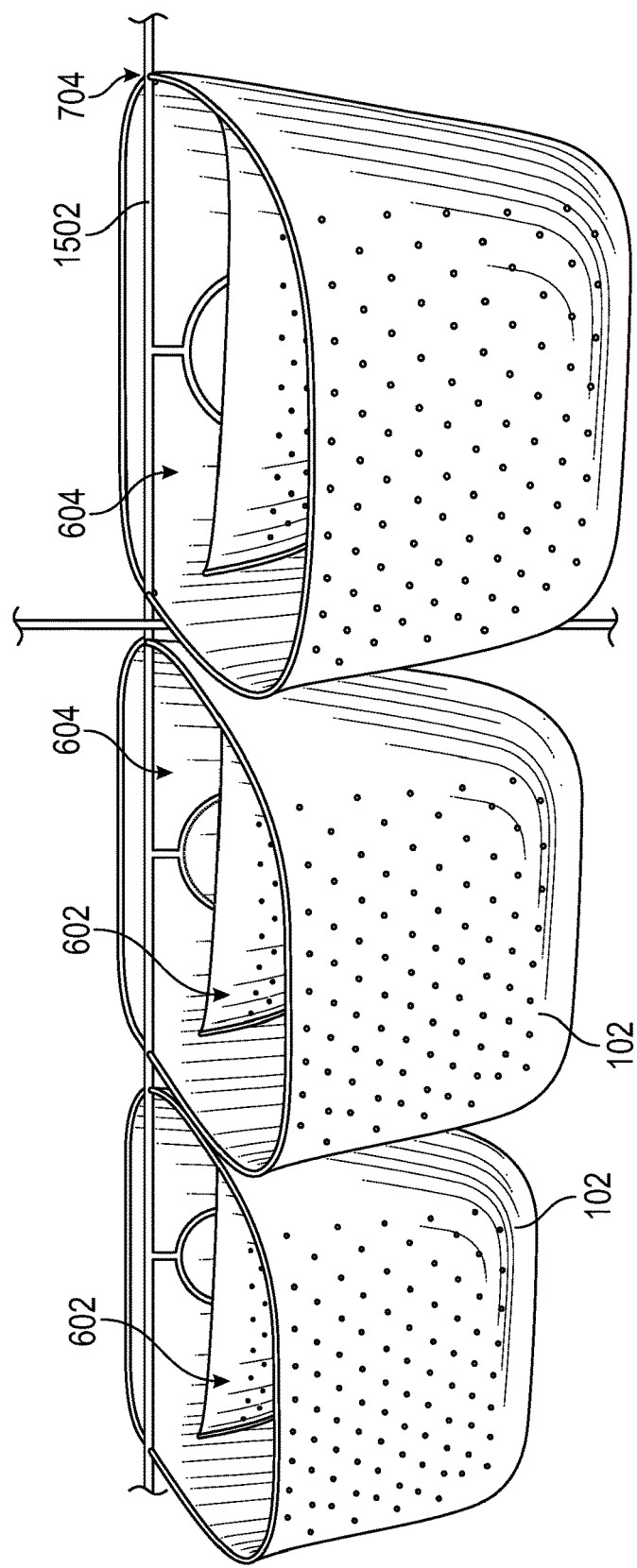
FIG. 15 representatively illustrates a top perspective view of an array of planters in accordance with the second exemplary embodiment of the present technology.

Referring now to FIGS. 8, 9, and 12, a second series of holes may be disposed along a surface of the interior divider 610 to form a second breathable zone 802. The second series of holes may be suitably configured to provide a passageway for air and/or moisture to pass between the forward interior portion 602 and the rear interior portion 604.

Referring now to FIGS. 1-4, the water distribution unit 110 may allow water to be dispersed into the interior 104 of the container 102. The water distribution unit 100 may be configured in any suitable manner to receive and distribute water into the container 102. For example, in one embodiment, the water distribution unit 110 may comprise a lower well section 302 and a cover 304 suitably configured to be selectively coupled to the lower well section 302. The water distribution unit 110 may further comprise an opening 112 suitably configured to provide access to the lower well section 302, such as to allow water to be poured into the lower well section 302 while the cover 304 is coupled to the lower well section 302.

The water distribution unit 110 may be configured to be coupled to an upper section of a rear facing wall element 202 of the container 102 such that the water distribution unit 110 is disposed near a soil level of the open interior 104 of the container 102. In an alternative embodiment, the water distribution unit 110 may be formed integrally with the container 102 to form a unitary structure.

The water distribution unit 110 may also be configured to incorporate a mounting system 708. For example, the water distribution unit 110 may comprise a notched tab 402 along a rearward facing surface of the lower well section 302 that is suitably configured to couple to a wall fastener such as a partially extended screw or bolt. The water distribution unit 110 may further comprise a second tab 404 that is suitably configured to selectively couple to a mating tab 406 disposed along a rearward wall element 202 of the container 102.

Figure 5:
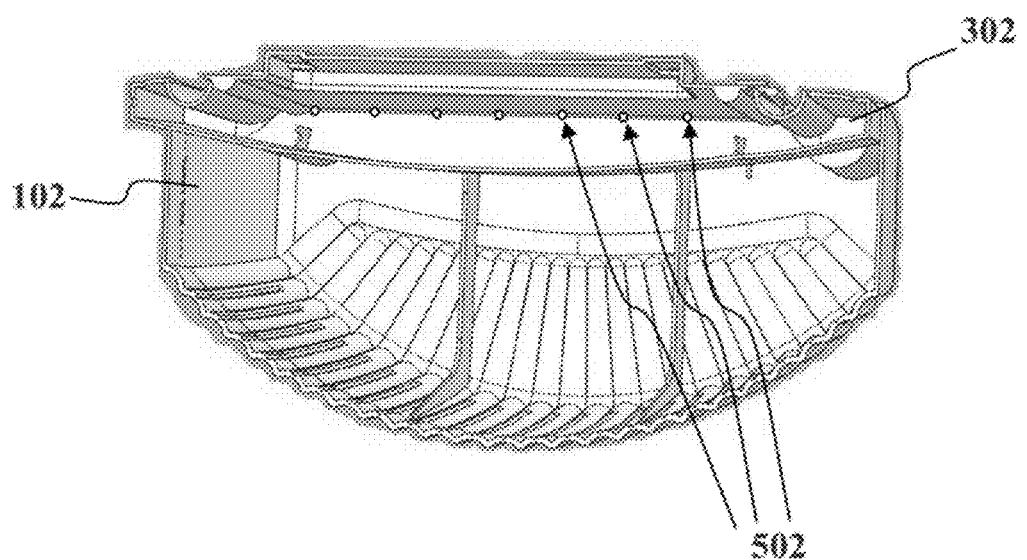
FIG. 5 representatively illustrates a top perspective view of the planter and the water dispersal unit in accordance with an exemplary embodiment of the present technology.

The lower well section 302 receives and distributes water into the open interior 104 of the container 102. The lower well section 302 may comprise any suitable system for dispersing water. For example, referring to FIG. 5, in one embodiment, the lower well section 302 may comprise a series of holes 502 disposed along a bottom surface of the lower well section 302. The holes 502 may be spaced such that water is equally dispersed along the soil surface to provide even watering. The holes 502 may also be positioned to distribute water along a rear wall of the container 102 away from the breathable zone 108 to reduce a potential for the water to run out the vertical slits 114 before reaching the moisture reservoir 106.

The holes 502 may comprise any suitable size or shape to provide for controlled distribution of water. For example, the holes 502 may be sized to provide a desired flow rate of water into the open interior 104 such that the water may be readily absorbed into the soil without overflowing the top edges of the container 102. In another embodiment, the lower well section 302 may comprise a selector that allows for the holes 502 to be selectively opened or closed to controllably adjust the rate of water flow into the open interior 104.

Referring now to FIGS. 8, 9, and 12, in an alternative embodiment, the interior divider 610 may facilitate the dispersal of water from the rear interior portion 604 into the forward interior portion 602. The interior divider 610 may be configured in any suitable manner to receive and distribute water into the open forward interior portion 602. For example, in one embodiment, the interior divider 610 may comprise a walled section suitably configured to act as a wall between the rear interior portion 604 and the forward interior portion 602. The interior divider 610 may comprise a plurality of openings suitably configured to allow water to seep from the rear interior portion 604 into the forward interior portion 602. For example, water poured into the rear interior portion 604 may seep into the soil held in the open forward interior portion 602 over time and any excess water not held by the soil may sink to the moisture reservoir 106 where it may be held in reserve. The interior divider 610 may further comprise a seep hole 1202 positioned along a lower portion of the interior divider 610 that may allow water to seep directly into the moisture reservoir 106.

The plurality of openings may comprise any suitable size or shape to provide for controlled distribution of water. For example, the plurality of openings may be sized to provide a desired flow rate of water into the forward interior portion 602 such that the water may be readily absorbed into the soil without overflowing the top edges of the container 102.

The container 102 and/or the water distribution unit 110 may also be configured to incorporate automatic watering systems such as drip irrigation systems. For example, in one embodiment, the rearward facing wall element 202 of the container 102 may comprise a recess 410 suitably configured to receive an irrigation line such as a flexible low pressure water line or a common PVC irrigation pipe. Similarly, the water distribution unit 110 may comprise a similar recessed area 408 that mates with the first recess 410 when the water distribution unit 110 is coupled to the container 102.

The water distribution unit 110 may be further configured to allow a drip line to pass from the recessed area 408 into an interior portion of the water distribution unit 110. For example, the water distribution unit 110 may comprise a drip line access point 208 suitably configured to allow a standard drip line, such as one-eighth inch or one-quarter inch, to pass into the interior portion of the water distribution unit 110. The water distribution unit 110 may be further be configured to secure the drip line within the interior of the water distribution unit 110. For example, an interior surface of the water distribution unit 110 may comprise a book or tab adapted to couple to the drip line and secure it in place.

Referring now to FIGS. 7-9 and 15, in a second embodiment, at least one sidewall element 202 of the container 102 may comprise a recess or notch 704 suitably configured to receive an irrigation line 1502 such as a flexible low pressure water line or a common PVC irrigation pipe. For example, the notch 704 may be suitably configured to allow a standard drip line, such as one-eighth inch or one-quarter inch flexible rubber or plastic tube, to pass into the interior portion of the rear interior portion 604. The container 102 may be further be configured to secure the drip line within the interior of the rear interior portion 604. For example, an interior surface of the container 102 may comprise a hook or tab adapted to couple to the drip line and secure it in place.

Figure 16:
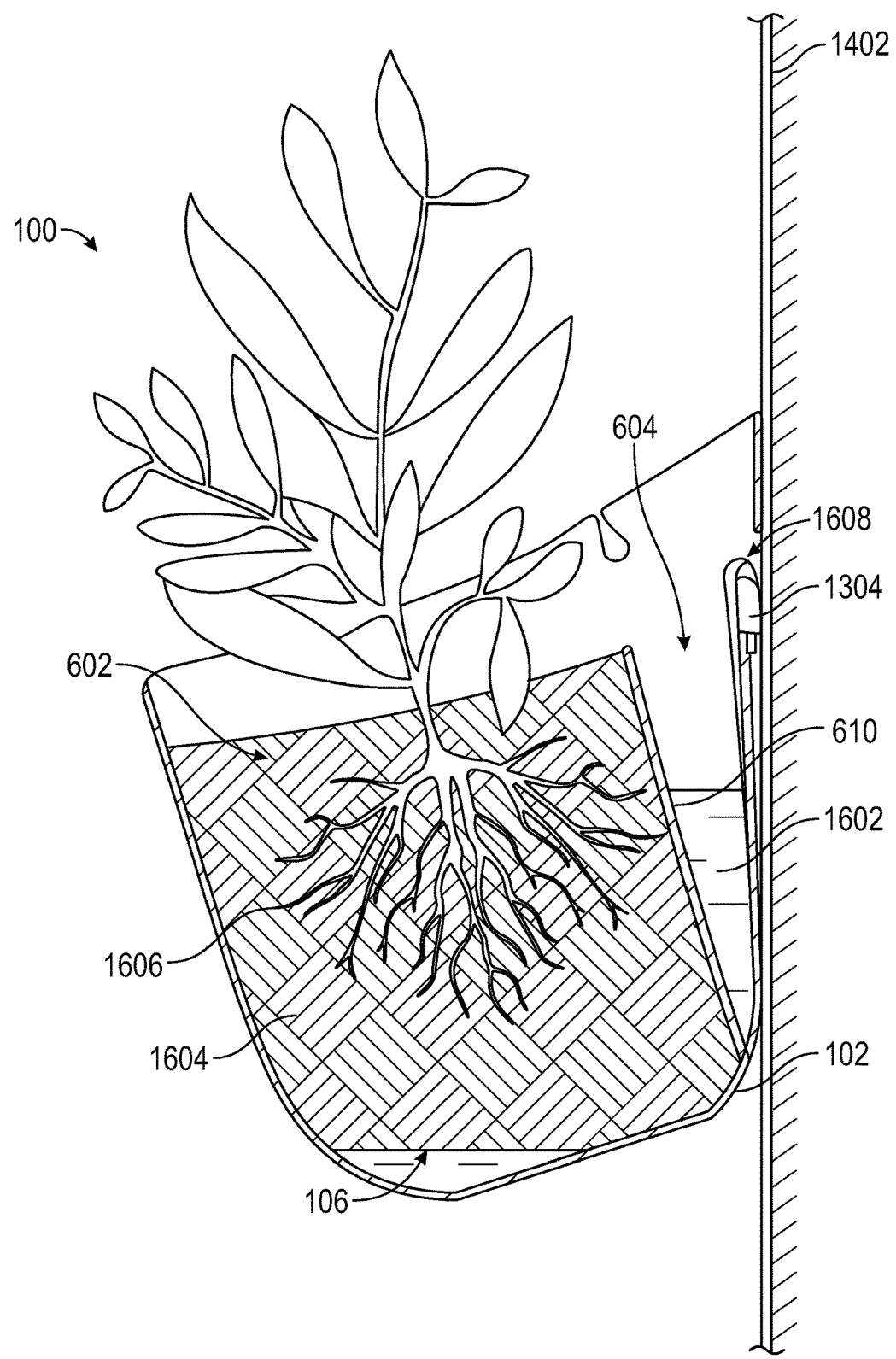
FIG. 16 representatively illustrates a side view of the planter having a plant, soil, and water positioned within in an interior portion in accordance with the second exemplary embodiment of the present technology.

Referring now to FIG. 16, in operation, the container 102 may be hung from a vertical surface such as a wall 1402. For example, a mounting adapter 1304 may be connected to the wall 1402 and a rear surface of the container 102 may be coupled to the mounting adapter 1304 to secure the container 102 to the wall 1402. A forward interior portion 602 of the container 102 may be filled with soil 1604 and a plant 1606. Water 160 may be dispersed into a rear interior portion 604 by any suitable method such as hose, a watering can, or an irrigation system. The water 1602 may flow into the forward interior portion 602 through one or more holes arranged in an interior divider 610. The water 1602 may dampen the soil 1604 such that any excess water 1602 not held by the soil may sink to a moisture reservoir 106 positioned at a bottom portion of the forward interior portion 602. Over time, moisture may be removed from the soil 1604 by the plant 1606 or it may evaporate through one or more breathable zones positioned along a forward facing portion of the container 102 and/or the interior divider 610.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the technology has been described with reference to specific exemplary embodiments. Various modifications and changes may be made, however, without departing from the scope of the present technology as set forth in the claims. The specification and figures are illustrative, rather than restrictive, and modifications are intended to be included within the scope of the present technology. Accordingly, the scope of the technology should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference as non-exclusive inclusion, such that a process, method, article, composition or apparatus that comprises a list of elements does not include only those elements recited, but may also include other elements not expressly listed, or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The invention claimed is:

1. A planter, comprising:
    a container having a base and a sidewall element disposed along peripheral edges of the base and extending upwardly therefrom to form a forward facing sidewall, a rear facing sidewall, and two opposing interior sidewall sections to define an interior of the planter;
    a connector element disposed along an exterior portion of the rear facing sidewall;
    an interior divider configured to extend between the two opposing interior sidewall sections of the sidewall element to define a forward interior portion and a rear interior portion of the interior of the planter; and
    an opening extending between an inner surface and an exterior surface of the forward facing sidewall associated with the forward interior portion, wherein:
        a moisture reservoir is defined by a first section within the forward interior portion of the planter between the base and a bottom of the opening; and
        a breathable zone is defined by a second section within the forward interior portion of the planter extending upwardly from the moisture reservoir to an upper edge portion of the forward facing sidewall.

2. A planter according to claim 1, wherein the opening comprises an array of holes arranged along and extending between a lower portion of the forward facing sidewall to the upper edge portion of the forward facing sidewall.

3. A planter according to claim 1, wherein the opening comprises a plurality of slits arranged along and extending between a lower portion of the first sidewall element to the upper edge portion of the first sidewall element.

4. A planter according to claim 1, further comprising a second opening disposed on the interior divider to define a second breathable zone separating the forward interior portion from the rear interior portion of the container.

5. A planter according to claim 1, wherein the interior divider is configured to be selectively removable from between the two opposing interior sections of the sidewall element.

6. A planter according to claim 1, wherein the connector element comprises a mounting system configured to selectively attach the planter to a substantially vertical surface.

7. A planter according to claim 1, wherein the base and sidewall element are formed as a single piece of plastic.

8. A planter according to claim 1, wherein the container further comprises a recess positioned:
- in a top edge portion of each of the two opposing sidewall elements; and
- above the rear interior portion of the planter.

9. A vertically hanging planter, comprising:
- a container having a base and a sidewall element disposed along peripheral edges of the base and extending upwardly therefrom to define:
  - a forward facing sidewall;
  - a rear facing sidewall;
  - a pair of rounded sidewall sections extending between the forward facing and rear facing sidewalls; and
  - an interior section bordered by the forward facing and rear facing sidewalls and the pair of rounded sidewall sections;
- a connector element disposed along an exterior portion of the rear facing sidewall;
- an interior divider configured to extend between the pair of rounded sidewall sections to define a forward interior portion and a rear interior portion of the interior section; and
- an array of holes arranged on the forward facing sidewall, wherein the holes extend between an inner surface and an exterior surface of the forward facing sidewall, wherein:
  - a moisture reservoir is defined by a first section within the forward interior portion of the interior section between the base and a bottom of the array of holes; and
  - a breathable zone is defined by a second section within the forward interior portion of the interior section extending upwardly from the moisture reservoir to an upper edge of the forward facing sidewall.

10. A vertically hanging planter according to claim 9, further comprising a second array of holes arranged on the interior divider to define a second breathable zone separating the forward interior portion from the rear interior portion of the interior section.

11. A vertically hanging planter according to claim 9, wherein the interior divider is configured to be selectively removable from between the pair of rounded sidewall sections.

12. A vertically hanging planter according to claim 9, wherein the connector element comprises a mounting system configured to selectively attach the planter to a substantially vertical surface.

13. A vertically hanging planter according to claim 9, wherein the base and sidewall element are formed as a single piece of plastic.

14. A vertically hanging planter according to claim 9, wherein the container further comprises a recess positioned:
- in a top edge portion of each of the pair of rounded sidewall sections; and
- above the rear interior portion of the planter.

15. A method of growing plants within a container coupled to a substantially vertical surface, comprising:
- positioning an interior divider between two opposing interior sections of a container having a base and a sidewall element disposed along peripheral edges of the base and extending upwardly therefrom to form a forward facing sidewall, a rear facing sidewall, and two opposing interior sidewall sections to define an interior of the planter having a forward interior portion and a rear interior portion, wherein:
  - an opening extends between an inner surface and an exterior surface of the forward facing sidewall associated with the forward interior portion;
  - a moisture reservoir is defined by a first section within the forward interior portion of the planter between the base and a bottom of the opening; and
  - a breathable zone is defined by a second section within the forward interior portion of the planter extending upwardly from the moisture reservoir to an upper edge portion of the forward facing sidewall; and
- coupling the container to the substantially vertical surface.

16. A method of growing plants within a container coupled to a substantially vertical surface according to claim 15, further comprising connecting a water irrigation line to a recess positioned:
- in a top edge portion of each of the two opposing interior sections; and
- above the rear interior portion.

17. A method of growing plants within a container coupled to a substantially vertical surface according to claim 15, further comprising filling a portion of the forward interior portion with least one of soil and a plant.

* * * * *